United States Patent
Warnakulasooriya et al.

(10) Patent No.: US 7,369,380 B1
(45) Date of Patent: May 6, 2008

(54) HIGHLY AVAILABLE DUAL SERIAL BUS ARCHITECTURE

(75) Inventors: Bernard Warnakulasooriya, Franklin, MA (US); Steven D. Sardella, Marlborough, MA (US); Mickey Steven Felton, Sterling, MA (US); Stephen E. Strickland, Marlborough, MA (US); Phillip Roux, Sutton, MA (US)

(73) Assignee: EMC Corporation, Hopkinton, MA (US)

( * ) Notice: Subject to any disclaimer, the term of this patent is extended or adjusted under 35 U.S.C. 154(b) by 197 days.

(21) Appl. No.: 11/431,337

(22) Filed: May 10, 2006

Related U.S. Application Data

(62) Division of application No. 10/608,635, filed on Jun. 27, 2003, now Pat. No. 7,154,723.

(51) Int. Cl.
*H02H 7/00* (2006.01)

(52) U.S. Cl. ........................................ 361/62
(58) Field of Classification Search .................. 361/62
See application file for complete search history.

(56) References Cited

U.S. PATENT DOCUMENTS

| | | | |
|---|---|---|---|
| 4,748,560 A | 5/1988 | Kataoka | 710/107 |
| 6,411,535 B1 | 6/2002 | Roux | 363/124 |
| 6,583,989 B1 | 6/2003 | Guyer et al. | 361/724 |
| 6,628,513 B1 | 9/2003 | Gallagher et al. | 361/685 |
| 6,725,302 B1 | 4/2004 | Benayoun et al. | 710/62 |
| 6,856,045 B1 * | 2/2005 | Beneditz et al. | 307/43 |
| 6,924,986 B1 | 8/2005 | Sardella et al. | 361/785 |
| 6,943,463 B2 | 9/2005 | Goerke et al. | 307/66 |
| 7,039,737 B1 | 5/2006 | Dorr et al. | 710/240 |
| 7,120,721 B1 | 10/2006 | Tuttle et al. | 714/305 |
| 7,127,638 B1 | 10/2006 | Sardella et al. | 714/15 |
| 7,154,723 B1 * | 12/2006 | Warnakulasooriya et al. | 361/62 |

* cited by examiner

*Primary Examiner*—Stephen W. Jackson
(74) *Attorney, Agent, or Firm*—BainwoodHuang

(57) ABSTRACT

In a highly available storage system, an enclosure includes first and second power supplies, and first and second controller boards. Each of the first and second controller boards includes first and second serial bus controllers. First and second serial buses are coupled to both of the first and second serial bus controllers on each of the first and second controller boards. The first serial bus is coupled to the first power supply, while the second serial bus coupled to the second power supply. The first and second serial buses are used for exchanging enclosure management and environmental information between the first and second power supplies and the first and second controller boards. The first and second serial buses are coupled to isolation switches so that redundant modules can operate if a serial bus controller fails.

11 Claims, 8 Drawing Sheets

HIGHLY AVAILABLE DUAL SERIAL BUS ARCHITECTURE

FIELD OF THE INVENTION

The present invention relates generally to storage systems, and more particularly to a highly available serial bus architecture useful for enclosure management.

BACKGROUND OF THE INVENTION

Today's networked computing environments are used in businesses for generating and storing large amounts of critical data. For example, banks, insurance companies, and manufacturing companies generate and store critical data related to their business and to their customers. It is therefore very important that the storage systems used for storing the critical data are highly reliable. "High Availability" storage systems employ various means for optimizing the reliability of storage systems.

High Availability systems are generally designed such that single points of failure are avoided. One means for avoiding single points of failure is to provide redundant components. For example, two processors may be provided such that if one fails, the other can assume the role of the first processor as well as its own. However, redundancy is costly and can be an inefficient use of resources.

Furthermore, when designing Highly Available systems, the failure of a component in the system can cause redundant pats of the system to fail as well. Special care must be taken to ensure that component failures do not cause cascading failures.

What is needed is a High Availability storage system that employs mechanisms for avoiding single points of failure efficiently and effectively.

SUMMARY OF THE INVENTION

In accordance one aspect of the invention, apparatus is provided including an enclosure including first and second power supplies. The enclosure also includes first and second controller boards. Each of the first and second controller boards includes first and second serial bus controllers. First and second serial buses are coupled to both of the first and second serial bus controllers on each of the first and second controller boards. The first serial bus is coupled to the first power supply, while the second serial bus coupled to the second power supply. The first and second serial buses are used for exchanging enclosure management and environmental information between the first and second power supplies and the first and second controller boards. The first and second power supplies share status information between each other, and status information related to the first power supply can be read from the second power supply via the serial bus to which the second power supply is coupled. According to a further aspect, each of the first and second power supplies includes first and second blowers, and status related to the first and second blowers is shared between the first and second power supplies. The status related to the first and second blowers in the first power supply can be read from the second power supply via the serial bus to which the second power supply is coupled. High availability is thereby maintained even though each power supply is coupled to only one serial bus.

According to another aspect of the invention, a system includes a first module including first and second serial bus controllers. A first serial bus is coupled to the first and second serial bus controllers. A second serial bus is also coupled to the first and second serial bus controllers. A second module is coupled to the first and second serial buses. First and second isolation switches on the first module are coupled to the first and second serial buses respectively. Logic on the first module causes the first and second isolation switches to open when either the first or second serial bus controller suffers a fault, such that the serial buses are isolated from the second module.

In accordance with an implementation, the logic includes a watchdog timer coupled to the first and second serial controllers for monitoring the first and second serial bus controllers to ascertain whether the first or second serial bus controller suffers a fault. A flip flop is coupled to the watchdog timer. The clock input of the flip-flop is driven by the watchdog timer such that when the watchdog timer ascertains that either the first or second serial bus controller has suffered a fault, the clock input of the flip-flop is asserted, causing an output of the flip-flop to be asserted. The output of the flip-flop coupled to the first and second isolation switches such that the when the output of the flip-flop is asserted the first and second isolation switches open.

Furthering this aspect of the invention, the system includes third and fourth serial bus controllers on the second module. A third serial bus is coupled to third and fourth serial bus controllers and to the first isolation switches. A fourth serial bus is also coupled to the third and fourth serial bus controllers and to the second isolation switches, such that when the logic on the first module causes the first and second isolation switches to open, the third and fourth serial buses remain functional. Moreover, third and fourth isolation switches on the second module are coupled to the third and fourth serial buses respectively. The output of the third and fourth isolation switches are coupled to outputs of the first and second isolation switches. Logic on the second module causes the third and fourth isolation switches to open when either the third or fourth serial bus controller suffers a fault, such that the first and second serial buses remain functional. The logic on the second module can be implemented with the watchdog timer and flip-flop as is done on the first module.

In accordance with another aspect of the invention, multiple serial controllers arbitrate for control of a serial bus. The arbitration utilizes redundant control lines, advantageously providing a highly available arbitration mechanism.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
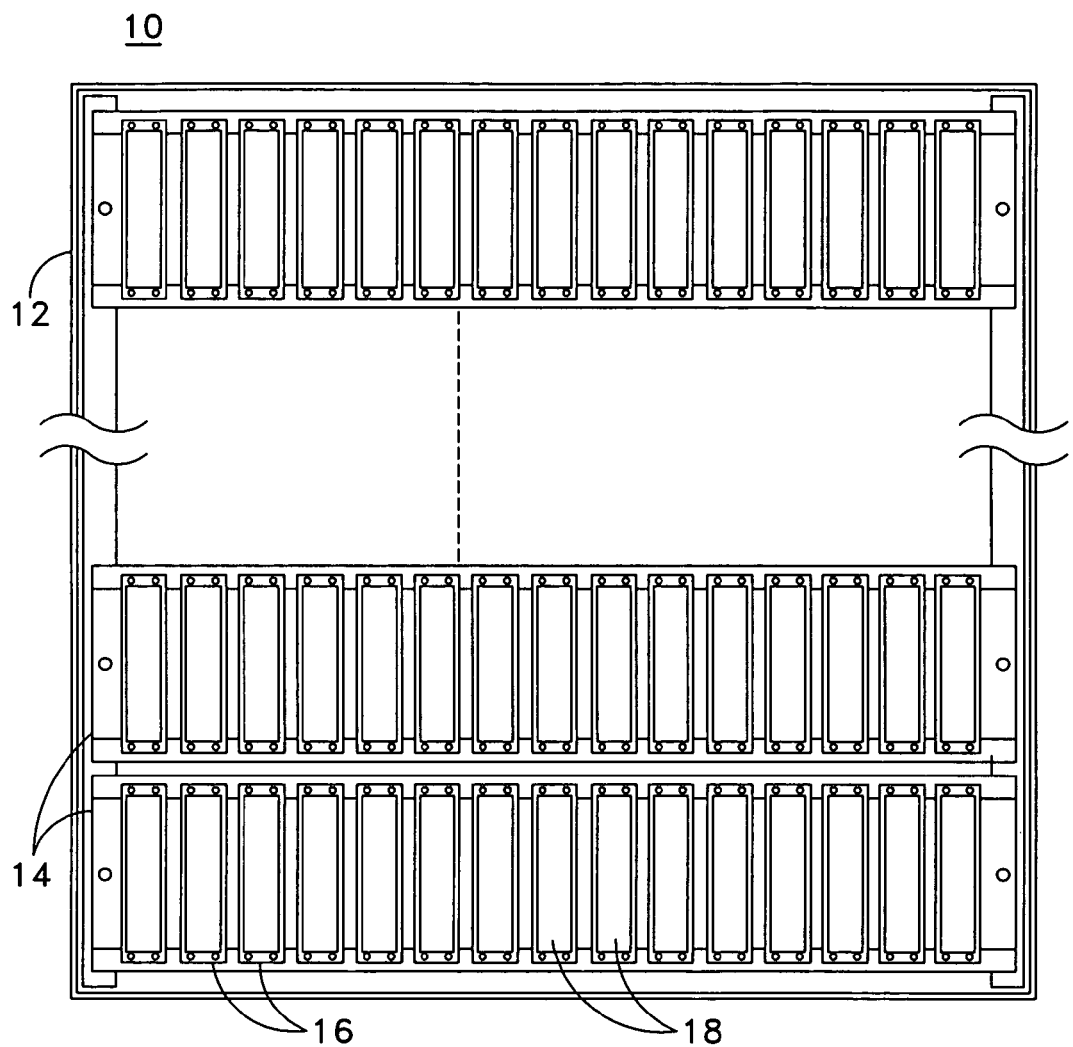
FIG. 1 is a representation of a storage system including several storage enclosures.

Referring to FIG. 1, there is shown an example of a storage system 10 in which the present invention may be employed. A rack mount cabinet 12 includes several storage enclosures 14. In accordance with the principles of the invention, each storage enclosure 14 has installed therein several disk drives 18. The disk drives 18 may be compatible with any low voltage differential signaling (LVDS) storage technology. For example, the disk driving 18 may be 2GB Fibre Channel disk drives, or they may be 4Gb Fibre Channel disk drives, or they may be Serial Advanced Technology Attachment (SATA) disk drives, or they may be Serial Attached SCSI (SAS) disk drives.

Figure 2:
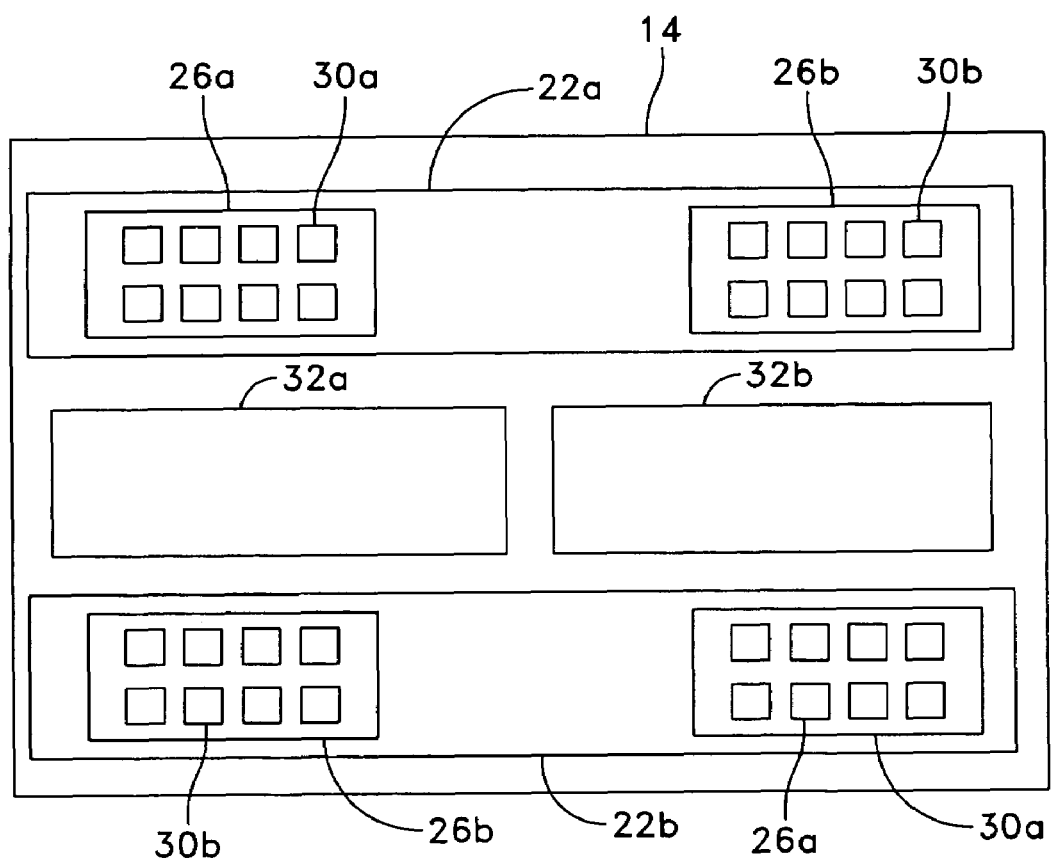
FIG. 2 is a rear view of one of the enclosures.

In FIG. 2 there is shown a rear view of one of the enclosures 14 in the storage system 10. The enclosure 14 includes a pair of link control cards (LCCs) 22a and 22b. Each link control card 22a,b includes a disk I/O interface 26a for interconnecting the disks in the enclosures 14 via, for example, four 2 Gigabit Fibrechannel connectors 30a. The LCCs 22a,b are exactly the same, but the LCC 22a is installed "upside down" relative to the LCC 22b for various reasons as set forth in the commonly owned patent application entitled "Midpane- Independent Implementations Of Data Storage System Enclosures", by Felton, herein incorporated by reference. A pair of power supplies 32a and 32b reside side-by-side between the link control cards 22a,b. The power supplies are also inverted relative to each other, again for various reasons as set forth in the previously mentioned patent application. Each enclosure 14 includes redundant power supplies 32a,b and LCCs 22a,b for high availability purposes. That is, if for example one LCC 22a in an enclosure 14 fails, the other LCC 22b will continues to operate and full access to all disk drives 18 is maintained. Likewise, a single one of the pair of power supplies 32a,b is capable of providing sufficient power for proper operation of the entire enclosure 14.

Figure 3:
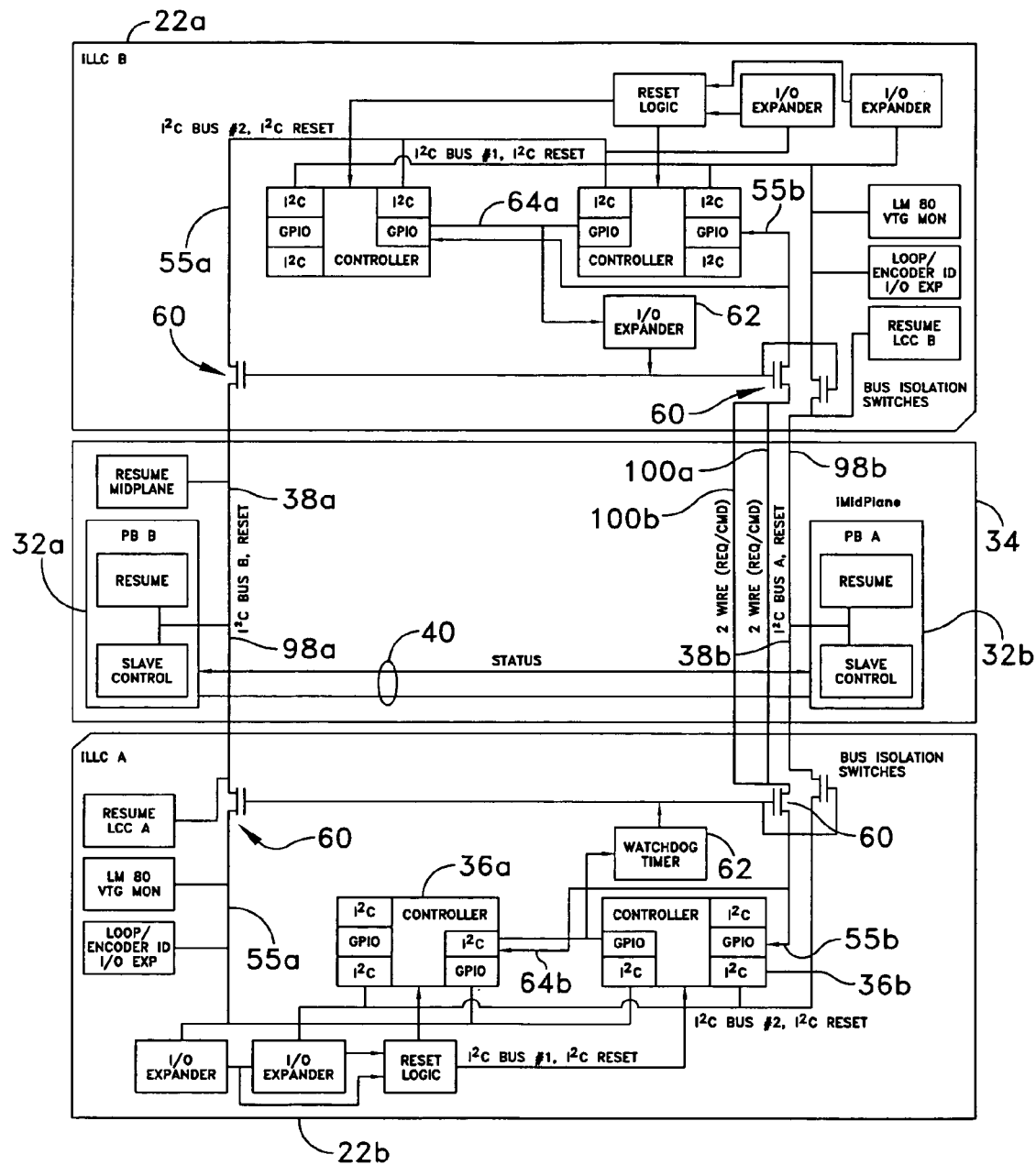
FIG. 3 is a block diagram of the modules in the enclosure of FIG. 2.

In FIG. 3 there is shown a block diagram of the internals of the enclosure 14. Shown are two LCCs 22a,b interconnected to two power supplies 32a,b via a midplane 34. Each LCC 22a,b includes two serial bus controllers 36a and 36b, herein implemented as I2C bus controllers. Each I2C bus controller 36a,b is coupled to a pair of I2C buses 38 a and 38b. The I2C buses 38a,b are used for environmental monitoring and enclosure management purposes. In accordance with the principles of the invention, each power supply 32a,b is coupled to one of the I2C buses 38a or 38b. One functional power supply 32a or 32b is capable of powering the entire enclosure 14.

Figure 4:
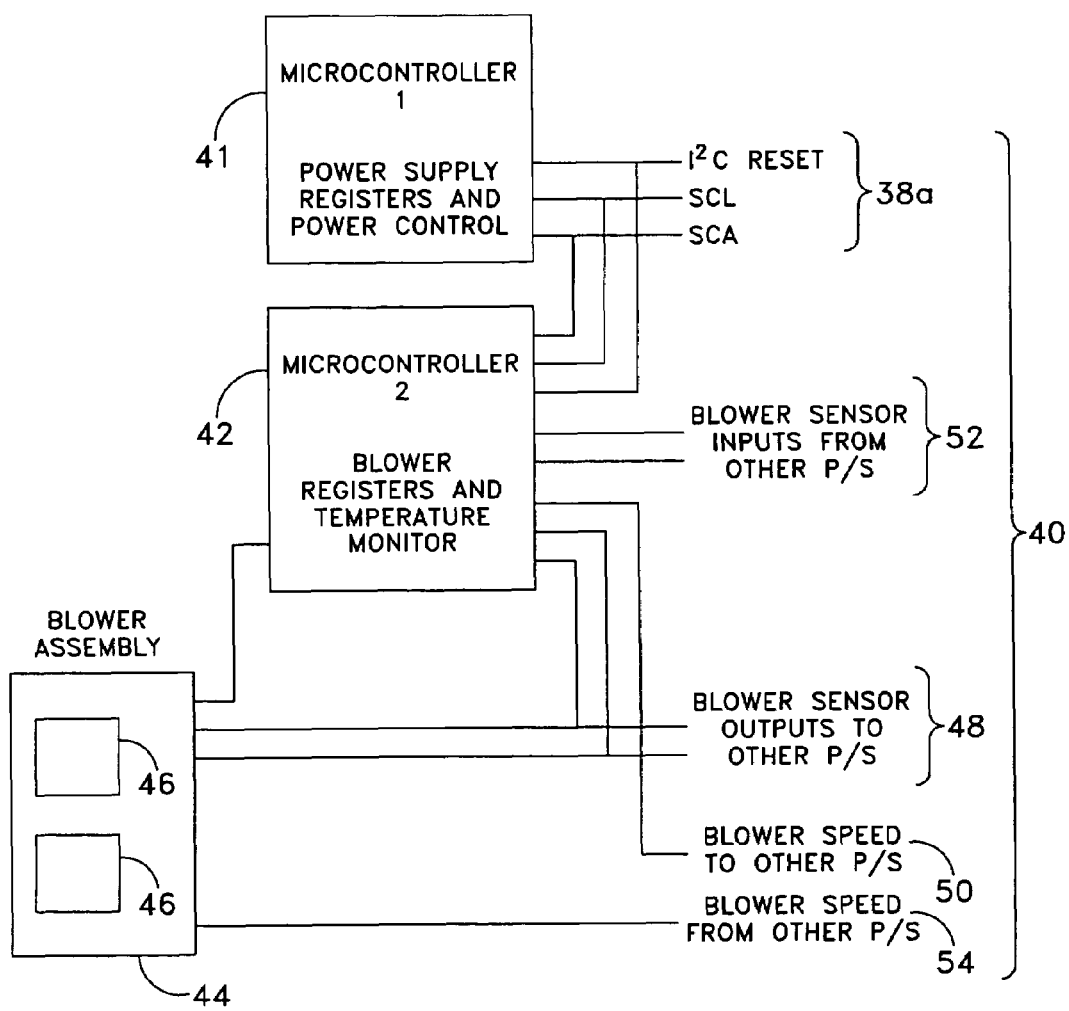
FIG. 4 is a block diagram of one of the power supplies shown in FIG. 3.

Furthermore, the power supplies 32a,b are capable of exchanging status information between each other via status lines 40. For example, referring to FIG. 4, each power supply (one is shown, 32a) includes two microcontrollers 41 and 42. The microcontroller 41 includes various registers for controlling the power supply and reporting power supply status. These registers are accessible via the I2C bus 32a, herein expanded to show its clock signal SCL and data signal SDA, and an attendant Reset signal I2C Reset. The second microcontroller 42 is also coupled to the I2C bus 38a. The microcontroller 42 is further coupled to a blower assembly 44 that contains a pair of blowers 46. Blower status, for example fault and speed status, is shared between the power supplies 32a,b. More particularly, the blower assembly 44 is power supply 32a provides blower sensor outputs 48 to the power supply 32b. The blower sensor outputs 48 provides an indication as to whether each blower 46 is properly operating. The microcontroller 42 provides a blower speed output 50 to the power supply 32b. Blower speeds are adjusted based upon temperature, as monitored by the microcontroller 42, and based upon how many blowers are operating. Furthermore, blower sensor inputs 52 and blower speed input 54 are received by the microcontroller 42 and the blower assembly 44 from the other power supply 32b.

Though each power supply 32a,b is coupled to only a single I2C bus, high availability is maintained—that is, single points of failure avoided. For example, if the I2C bus 38a fails, the power supply 32a is capable of collecting status information from the power supply 32b via the status lines 40. So for example if one blower fails in power supply 32a, the other power supply 32b can detect this via the blower sensor inputs 52 from the power supply 32a. The power supply 32b then causes the remaining blowers 46 to speed up. The enclosure 14 thereby remains fully functional. As a further example, the blower assembly 44 may receiver a blower speed input 54 indicating that the blowers 46 should increase speed. The system advantageously minimizes the extent to which signals must be routed by utilizing the serial bus in combination with the sharing of status signals between power supplies.

In accordance with another aspect of the invention as can be seen in FIG. 3, isolation switches 60 are provided for isolating the I2C controllers 36a and 36b from the I2C buses 38a and 38b in the event of a controller failure. Thus, if one LCC, for example LCC 22a suffers an I2C controller failure which would cause an I2C bus to malfunction, the LCC 22a is isolated from the I2C buses 38a,b, and the other LCC 22b can continue to use the I2C buses 38a,b. The portion of the I2C buses that run between the I2C controllers 36a,b and the isolation switches 60 are designated 55a,b. When the isolation switches 60 are closed, the I2C buses 55a,b are directly connected to the I2C buses 38a,b. When the isolation switches 60 are open, the I2C buses 55a,b are disconnected from the I2C buses 38a,b.

As shown, each I2C controller 36a,b on each LCC 22a,b is coupled to a watchdog circuit 62. When the I2C controllers 36a,b are operating properly, they each provide a heartbeat signal 64a,b which is monitored by the watchdog circuit 62. It either I2C controller 36a,b malfunctions, it will cease to provide the heartbeat signal 64a,b. If, for example, the watchdog circuit 62 detects the absence of a heartbeat signal 64a,b from either controller 36a,b respectively on the LCC 22a, it causes the isolation switches 60 to open, thereby isolating the I2C buses 55a,b on the LCC 22a from the I2C buses 38a,b on the midplane 34 and other LCC 22b.

Figure 5:
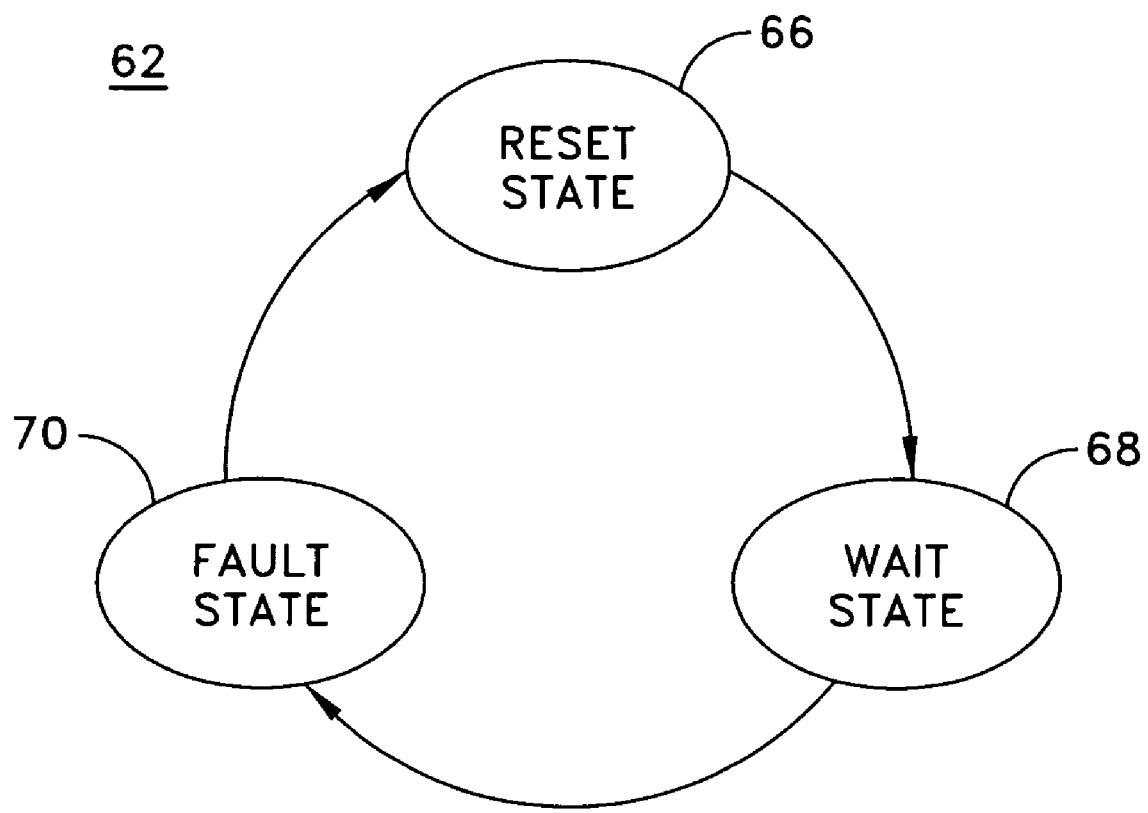
FIG. 5 is state diagram representing the operation of the watchdog circuit of FIG. 3.

In FIG. 5 there is shown the logical operation of the watchdog circuit 62. The watchdog circuit 62 operates in the same manner on LCC 22a and 22b, so one watchdog circuit is shown for example as is operates on the LCC 22a. The watchdog circuit 62 begins in a Reset state 66, wherein the isolation switches 60 are open, thus isolating the LCC 22a from the I2C buses 38a,b. Powering up the LCCs 22a,b in an isolated state is particularly advantageous during a "hot swap", because communications can continue of the I2C buses while the new module is being inserted. After initialization, the controllers 36a,b place the watchdog circuit 62 in a wait state 68, during time the isolation switches 60 are closed and the heartbeat signals 64a,b from the I2C controllers 36a,b are monitored. When either heartbeat signal ceases, the watchdog circuit 62 enters the Fault state 70, during which time the isolation switches 60 are opened, thereby isolating the I2C buses 55a,b from the I2C buses 38a,b. Upon correction of the fault, the watchdog circuit 62 proceeds back through the Reset state 66 to the Wait state 68.

Figure 6:
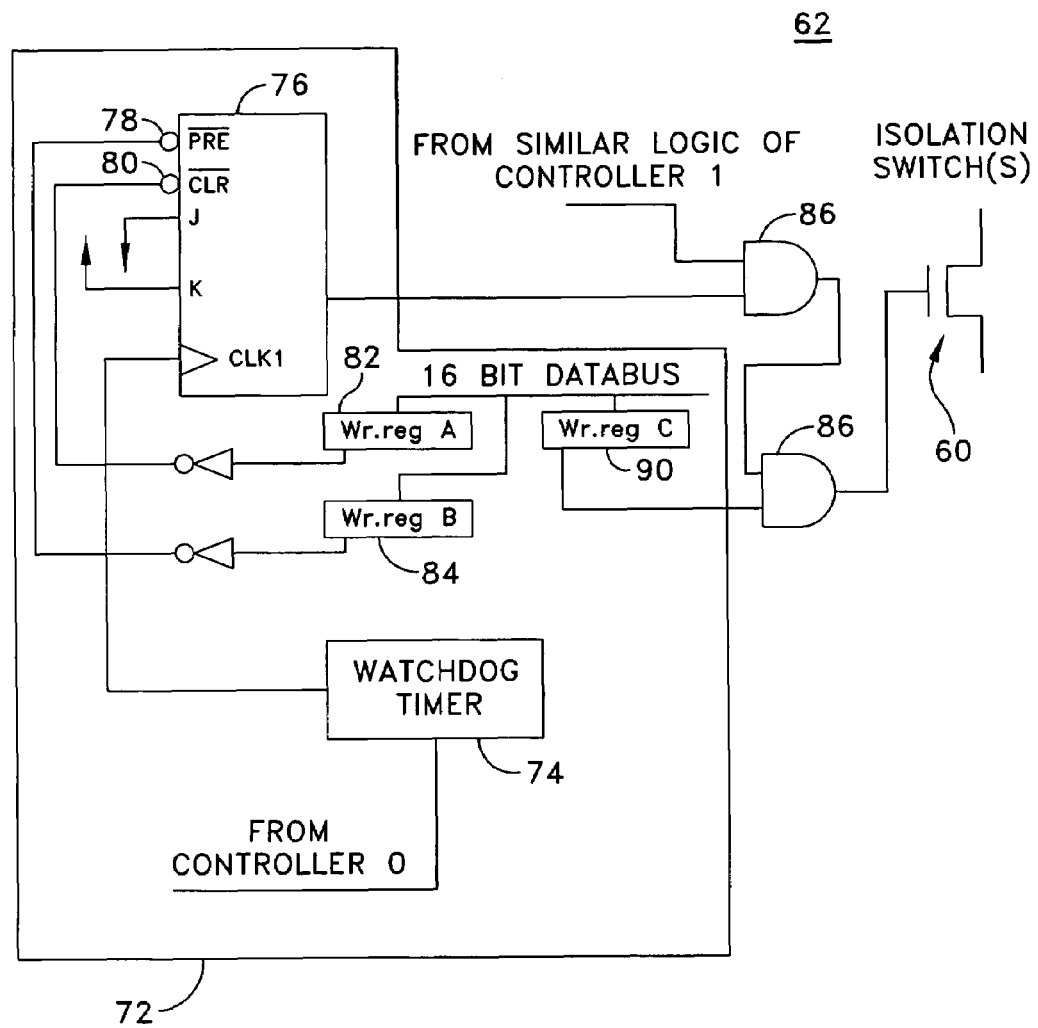
FIG. 6 is an example implementation of the watchdog circuit of FIG. 5.

More particularly, referring to FIG. 6, the portion 72 of the watchdog circuit 62 is shown as it operates with regard to one of the I2C controllers 36a, with the understanding that the portion 72 is duplicated for the other I2C controller 36b and enters the circuit where labeled "from controller 1". The watchdog circuit 62 includes a watchdog timer 74 coupled to a JK flip-flop 76. The preset input 78 and clear input 80 of the J-K flip-flop 76 are coupled to write registers 82 and 84. The output of the J-K flip-flop 76 is coupled through 'AND' gates 86 to the isolation switches 60. On power up, the registers 82, 84, and 90 power up active low, causing the outputs of the 'AND' gates 86 to go low. The isolation switches 60 then open, thereby disconnecting the LCCs 22a,b from the I2C buses 38a,b. A controller 36a,b on the LCCs 22a,b writes to the registers 82, 84, and 90 to cause their outputs to go low and then high. While the outputs are low, the isolation switches are open and the watchdog circuit is in the Reset state 66. Writing the output to high causes the isolation switches 60 to close, and thus connectivity on the I2C buses 38a,b occurs after power-up. The watchdog circuit 62 is now in the Wait state. Upon absence of a heartbeat signal, for example from the I2C controller 36a on LCC 22a, the watchdog timer 74 asserts its output 92 which clocks the J-K flip flop 76. This causes the output 94 of the J-K flip flop 76 to go low, causing the isolation switches 60 to open, thereby isolating the I2C buses 38a,b from the LCC 22a and thus from the I2C controllers 36a,b and the I2C buses 55a,b on the LCC 22a. The watchdog circuit 62 is now in the Fault state. Upon correction of the fault, firmware writes the registers as was described for the Reset state.

In accordance with a further aspect of the invention, the isolation switches 60 may be opened in response to a board Reset. There may be failure modes which would cause one of the I2C buses on an LCC 22a,b to malfunction exterior to one of the controllers 36a,b. In this case, the heartbeat signals may still operate. So, it is desirable to provide a further mechanism for isolating the I2C buses 38a,b. As seen in FIG. 6, a register 90 is coupled to the "AND" gates 86 that drive the isolation switches 60. When a board Reset is sensed, the register 90 is written such that its output goes low, thereby causing the isolation switches 60 to open. In addition, it is possible to known what caused the isolation switches 60 to open. If the watchdog timers caused the switches 60 to open, the contents of register 90 will be high. If a reset caused it, register 90 will be low. Furthermore, the output of the J-K flip flop 76 is coupled to a real register 91. If a controller 36a,b reads the register 91 and finds that the J-K flip flop 76 output is high, then a board reset must have caused the isolation switches 60 to open. If the output of the J-K flip flop 76 is low, then the watchdog timer 74 caused the isolation switches 60 to open.

One skilled in the art will realize that the asynchronous logic example shown in FIG. 6 is one of many possible logical implementations, and that many different asynchronous and synchronous circuit can be designed to perform the function of FIG. 5.

Further in accordance with the principles of the invention, as seen in FIG. 3, I2C Reset signals 98a and 98b are provided along with the I2C buses 38a,b. The I2C Reset signals 98a,b are routed along with the I2C buses 38a,b and isolated in the same manner. The I2C Reset signals 98a,b can be used by an I2C controller 36a,b in master mode to reset the I2C controllers 36a,b in slave mode. Thus, when firmware senses a problem with the bus, all I2C devices can be reset by asserting the Reset signals 98a,b.

In accordance with a further aspect of the invention, one LCC can isolate its peer LCC from the I2C buses. For example, if LCC 22a senses, either via the I2C bus 38a,b or by other means, that its peer LCC 22b is malfunctioning, the LCC 22a can send a command via the I2C bus 38a,b to cause either controller 36a,b on the LCC 22b to cause the isolation switches 60 to open, thus isolating the LCC 22b from the buses 38a,b. More particularly, referring to FIG. 6, the I2C controllers 36a,b are coupled to the reset input 93 of the register 90. By asserting the reset input 93 of the register 90, an I2C controller 36a,b from, for example, LCC 22a, can cause the isolation switches 60 on LCC 22b to open, thereby isolation LCC 22b from the buses 38a,b.

Figure 7:
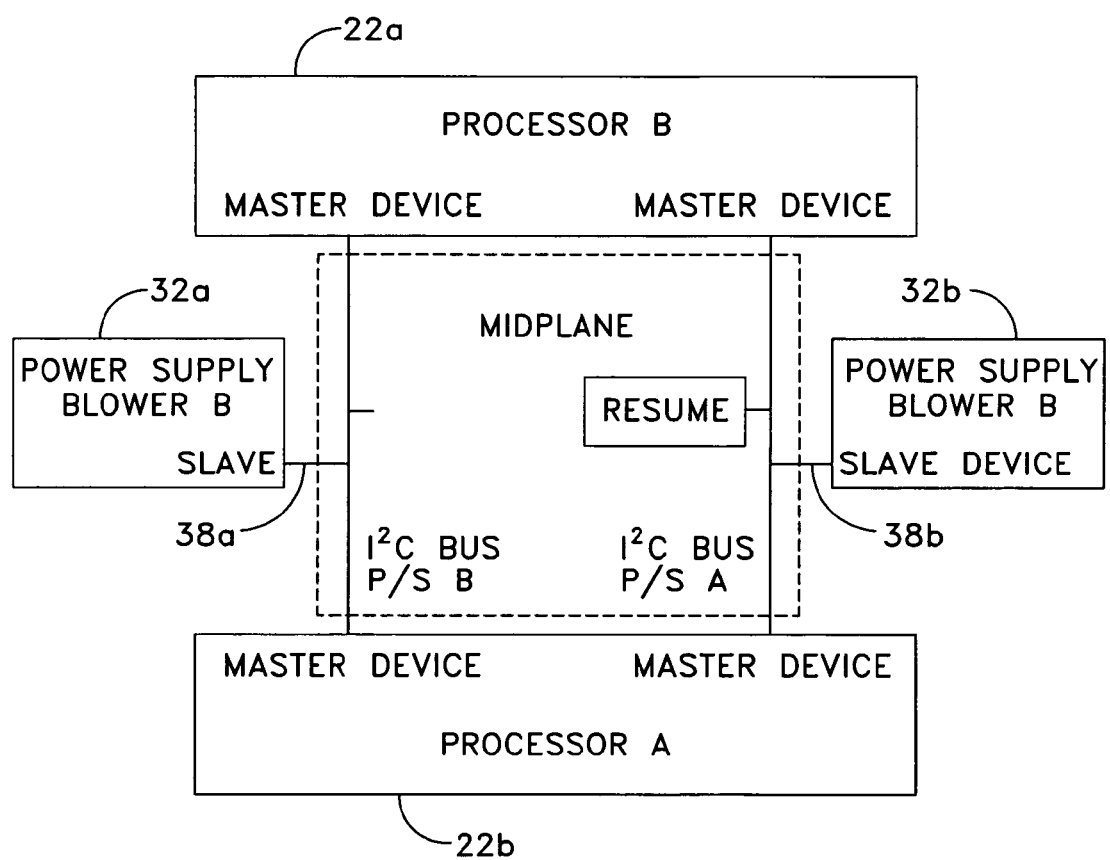
FIG. 7 is a block diagram showing straight-through I2C bus connections between the link control cards and the power supplies.

Referring back to FIG. 2, the LCCs 22a and 22b are installed in the enclosure 14 such that the upper LCC 22a is "upside down" relative to the lower LCC 22b. However, as shown in FIG. 7, the I2C buses 38a,b are efficiently routed straight through the midplane 34 where they are tapped by the power supplies 32a,b. Referring also to FIG. 3, note that, if installed in the top slot, an LCC 22a detects power supply 32a on local I2C bus 55a and power supply 22b on local I2C bus 55b. But, if the same LCC is installed in the bottom slot, then power supply 22a is detected on I2C bus 55b and power supply 22b is detected on I2C bus 55a. So, firmware in the LCC detects whether it is plugged into the upper or lower slot in the enclosure, and re-maps the I2C buses accordingly. That is, if the LCC 22a is plugged into the lower slot in the enclosure 14, the I2C controller 36a will detect such and will map the I2C bus 55a to the power supply 22b and will map the I2C bus 55b to the power supply 22a. On the other hand, if the LCC 22a is plugged into the upper slot in the enclosure 14, the I2C controller 36a will detect such and will map the I2C bus 55a to the power supply 22a and will map the I2C bus 55b to the power supply 22b. According to a preferred implementation, Slot ID bits 101 (FIG. 3) are provided on the midplane 34 into which the LCCs 22a and 22b are plugged. The I2C controllers 36a,b are able to read the Slot ID bits 101 to determine how to map the I2C buses 55a,b.

It should be noted that, when the system is fully operational, both LCCs 22a and 22b are capable of driving the I2C buses 38a and 38b. Thus, in accordance with another aspect of the invention, a bus arbitration mechanism is provided. In FIG. 3 it can be seen that two pairs of control signals 100a and 100b are coupled between the LCCs 22a and 22b. Two control signals 100a are associated with the first I2C bus 38a, while the other two control signals 100b are associated with the second I2C bus 38b. The control signals serve the same purpose and are redundant for high availability. The arbitration mechanism is described for one I2C bus 38a, with the understanding that it operates the same way for the other I2C bus 38b.

Figure 8:
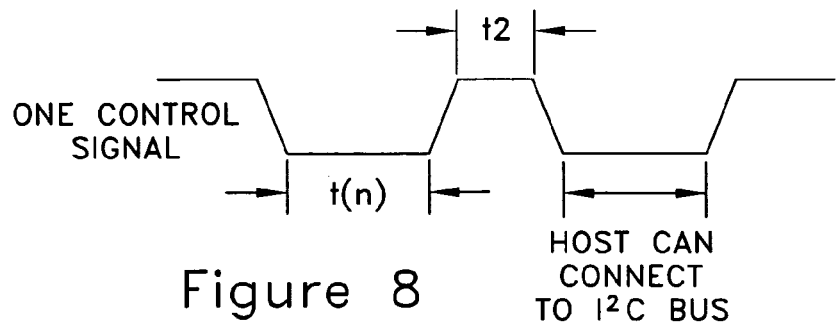
FIG. 8 shows the timing for an arbitration control signal.

Referring to FIG. 8, generally, when an I2C controller, for example controller 36a on LCC 22a, wants to use the I2C bus 38a, it will check to make sure the control signals 100a are high—i.e. not driven. It will then pull the control signals 100a low for a period of time related to the identity of the controller. It will then release the control signals 100a. If the control signals go high, the controller 36a then drives the bus.

More particularly, the following parameters are defined:
t2=time bus is released after control lines are driven
T1=2*t2
  td=delay time
  n=host number; i.e. potential bus master number, e.g. I2C controller number
  r=number of request attempts
  t(n)=T1+(r−1)*t2+n*td=time each host drives the control lines to obtain the bus.

Figure 9:
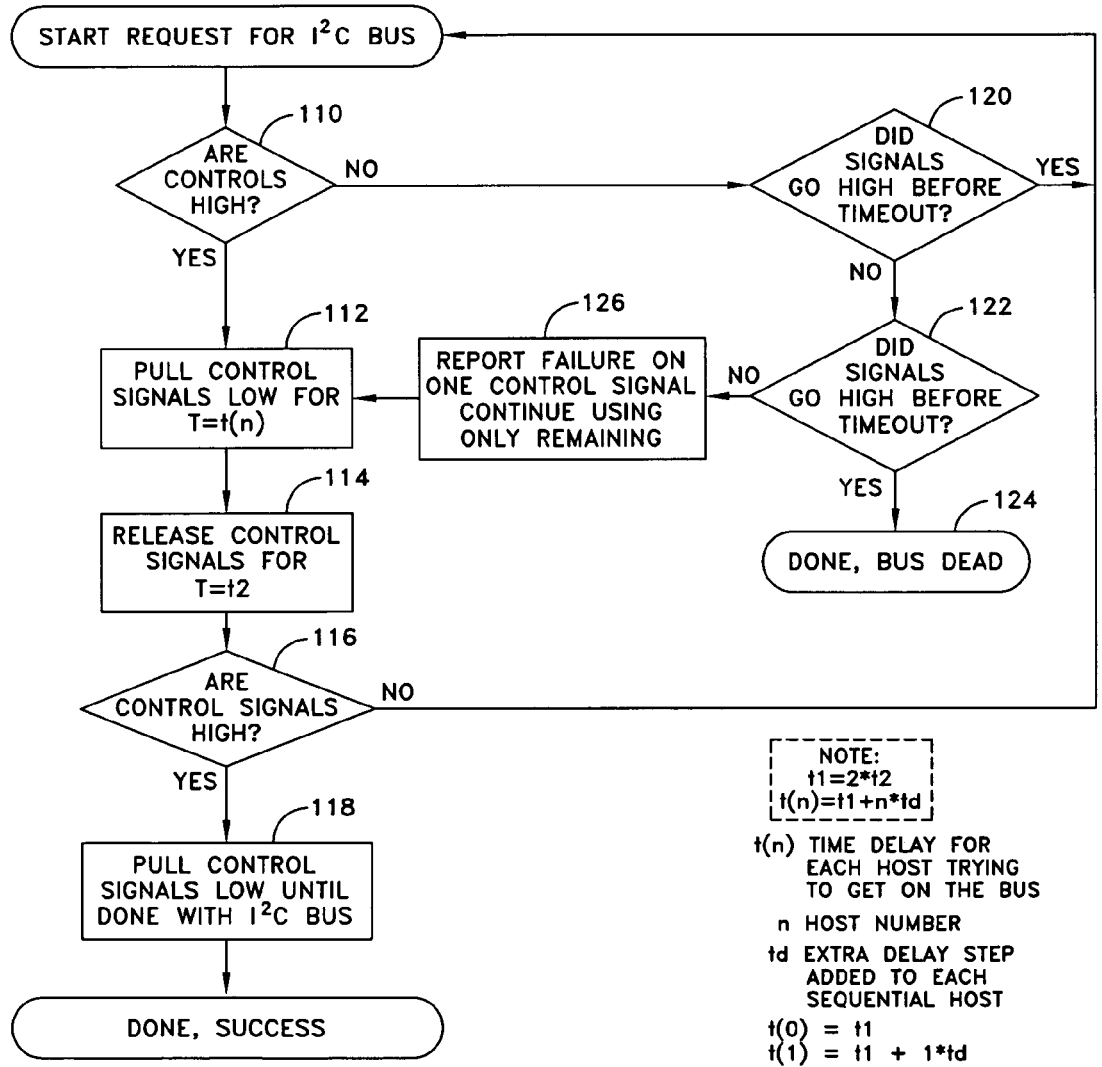
FIG. 9 is a flow diagram showing the I2C bus arbitration mechanism.

Referring to the flow diagram of FIG. 9, when a potential bus master such as the I2C controller 36a requires access to the I2C bus 38a, it first checks to see if the control lines 100a are high (step 110). If they are high, no other device is currently using the I2C bus 38a. So, the controller 36a starts the arbitration sequence by pulling both control lines 100a low for t(n) time (step 112). For example, if the controller 36a is designated number 0, then it will drive the control lines 100a for t1 time. If it is designated number 2, then it will drive the control lines 100a for t1+2*td time. After t(n) time the controller ceases driving the control lines for t2 time (step 114). It then checks to see if the control lines 100a are high (step 116). If they are high, then no other controller is currently trying to take control of the bus, so the controller 36a drives the control signals low and proceeds with an I2C bus cycle (step 118). In this way, when multiple controllers require access to the bus at the same time, the controller with the higher designated number will win control of the bus.

If a controller 36a fails to gain access to the bus, then during its next attempt it will drive the control lines for a longer period of time related to the parameter "r". This prevents bus starvation for lower designated controllers.

Referring back to step 110, if the controller checks the control lines 100a and finds that they are low, then another device is probably using the I2C bus 38a. The controller 36a then proceeds to monitor the control signals 100a until a timeout has passed (step 120). The timeout is preferably at least as long as a maximum I2C bus cycle. If the control lines 100a go high by the end of the timeout period, the controller 36a proceeds back through the arbitration phases. If the control lines 100a do not both go high by the end of the timeout period, the controller 36a then checks to see if they are both low (step 122). If so, the bus has malfunctioned and an error state must be entered (step 124). If one control line 100a is high, then the controller 36a reports a failure of the other control line 100a (step 126) and uses the high control line 100a to proceed through the arbitration steps 110–118. The dual control signals 100a thereby provide high availability for the arbitration mechanism.

The present invention is not to be limited to scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the invention. Further, although aspects of the present invention have been described herein in the context of a particularly implementation in a particularly environment for a particular purpose, those of ordinary skill in the art will recognize that its usefulness is not limited thereto and that the present invention can be beneficially implemented in any number of environments for any number of purposes. For example, though the invention has been described in terms of a storage system, it is clear that the invention can be employed in any type of system wherein a highly available serial bus architecture would be useful—for example, computer systems.

We claim:

1. Apparatus comprising:
an enclosure;
first and second power supplies in the enclosure;
first and second controller boards in the enclosure, each of the first and second controller boards having first and second serial bus controllers thereon;
first and second serial buses, each of the first and second serial buses coupled to both of the first and second serial bus controllers on each of the first and second controller boards;
the first serial bus coupled to the first power supply, the second serial bus coupled to the second power supply.

2. The apparatus of claim 1 wherein the first and second serial are used for exchanging enclosure management and environmental information between the first and second power supplies and the first and second controller boards.

3. The apparatus of claim 2 wherein the first and second power supplies provide status information to each other, and wherein status information related to the first power supply can be read from the second power supply via the serial bus to which the second power supply is coupled.

4. The apparatus of claim 3 wherein each of the first and second power supplies includes first and second blowers, and wherein status related to the first and second blowers is shared between the first and second power supplies.

5. The apparatus of claim 4 wherein the status related to the first and second blowers in the first power supply can be read from the second supply via the serial bus to which the second power supply is coupled.

6. The apparatus of claim 5 wherein the enclosure resides in a storage system.

7. A method comprising the steps of:
providing an enclosure;
providing first and second power supplies in the enclosure;
providing first and second controller boards in the enclosure, each of the first and second controller boards having first and second serial bus controllers thereon;
coupling first and second serial buses to both of the first and serial bus controllers on each of the first and second controller boards;
coupling the first serial bus to the first power supply, and coupling the second serial bus to the second power supply.

8. The method of claim 7 including the step of exchanging enclosure management and environmental information between the first and second power supplies and the first and second controller boards via the first and second serial buses.

9. The method of claim 8 further comprising the step of reading status information related to the first power supply from the second power supply via the serial bus to which the second power supply is coupled.

10. The method of claim 9 further comprising the steps of:
providing first and second blowers in each of the first and second power supplies;
exchanging status related to the first and second blowers between the first and second power supplies.

11. The method of claim 10 further comprising the step of reading the status related to the first and second blowers in the first power supply from the second power supply via the serial bus to which the second power supply is coupled.

* * * * *